(12) United States Patent
Erden (10) Patent No.: US 10,002,625 B1
(45) Date of Patent: Jun. 19, 2018

(54) RECORDING HEAD WITH MULTIPLE MAGNETIC WRITERS SIMULTANEOUSLY WRITING TO ADJACENT TRACKS

(71) Applicant: Seagate Technology LLC, Cupertino, CA (US)

(72) Inventor: Mehmet Fatih Erden, St. Louis Park, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days. days.

(21) Appl. No.: 15/432,131

(22) Filed: Feb. 14, 2017

(51) Int. Cl.
| | |
|---|---|
| *G11B 5/265* | (2006.01) |
| *G11B 5/29* | (2006.01) |
| *G11B 5/596* | (2006.01) |
| *G11B 5/48* | (2006.01) |
| *G11B 5/31* | (2006.01) |
| *G11B 5/00* | (2006.01) |

(52) U.S. Cl.
CPC .............. *G11B 5/2654* (2013.01); *G11B 5/29* (2013.01); *G11B 5/314* (2013.01); *G11B 5/4886* (2013.01); *G11B 5/596* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 4,979,051 A | 12/1990 | Eggebeen | |
| 6,906,879 B1 | 6/2005 | Albrecht et al. | |
| 7,253,986 B2 | 8/2007 | Berman et al. | |
| 9,875,758 B1* | 1/2018 | Trantham et al. | ........ G11B 5/29 |
| 2002/0135918 A1* | 9/2002 | Ozue et al. | ............ G11B 5/488 360/55 |
| 2004/0021982 A1* | 2/2004 | Ozue et al. | .......... G11B 5/3103 360/123.12 |
| 2005/0007700 A1* | 1/2005 | Nagai | ..................... G11B 5/584 360/241.1 |
| 2005/0013042 A1* | 1/2005 | Rubas et al. | ......... G11B 5/4976 360/119.02 |
| 2005/0152066 A1* | 7/2005 | Yip | ...................... G11B 5/4976 360/241.1 |
| 2005/0152067 A1* | 7/2005 | Yip et al. | ............. G11B 5/4976 360/241.1 |

\* cited by examiner

*Primary Examiner* — Craig A. Renner
(74) *Attorney, Agent, or Firm* — Hollingsworth Davis, LLC (57) ABSTRACT

A recording head has a first magnetic writer and a second magnetic writer offset from the first magnetic writer in a downtrack and crosstrack direction. The recording head has leads configured to deliver respective first and second write and/or laser currents to the first and second writers. The first and second write and/or laser currents enable the first and second writers to simultaneously write to adjacent tracks of a magnetic disk.

19 Claims, 9 Drawing Sheets

RECORDING HEAD WITH MULTIPLE MAGNETIC WRITERS SIMULTANEOUSLY WRITING TO ADJACENT TRACKS

SUMMARY

The present disclosure is directed to a recording head with multiple magnetic writers. In one embodiment, a recording head has a first magnetic writer and a second magnetic writer offset from the first magnetic writer in a downtrack and crosstrack direction. The recording head has leads configured to deliver respective first and second write and/or laser currents to the first and second writers. The first and second write and/or laser currents enable the first and second writers to simultaneously write to adjacent tracks of a magnetic disk.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic disk drive storage. While newer technologies such as solid-state drives (SSD) are gaining popularity due, e.g., to high speed and mechanical ruggedness, there are still a number of applications where traditional magnetic disk storage, or hard disk drive (HDD), is preferable. For example, the cost per unit of data stored for disk storage is much lower than in technologies such as SSD. For some applications, the combination of low cost and high capacity makes the HDD the best option. As such, hard drive manufacturers are attempting to further increase areal density (AD) of disk storage to maintain this cost advantage, while also increasing performance, e.g., data throughput.

Increases in AD of magnetic data storage devices may be achieved by aggressively increasing bits-per-inch (BPI) and tracks-per-inch (TPI) of the recording media. Current challenges in increasing TPI (e.g., squeezing tracks closer together) include increasing the possibility of the read-head picking up interference from adjacent tracks. One way to deal with this is to use a two-dimensional magnetic recording (TDMR) system that utilizes a read element that can read more than one track at a time, which also helps sequential read performance in addition to improving AD.

Current implementations of TDMR storage devices can perform simultaneous reading of adjacent tracks, but not simultaneous writing. Implementing simultaneous writing of adjacent tracks will enable a fuller realization of the advantages of TDMR. In this disclosure, apparatuses and methods are described that can perform simultaneous writing of adjacent tracks using two or more writers, e.g., magnetic write transducers such as a coil magnetically coupled to a write pole. This can be used in a data storage device such as a hard disk drive apparatus shown in FIG. 1.

Figure 1:
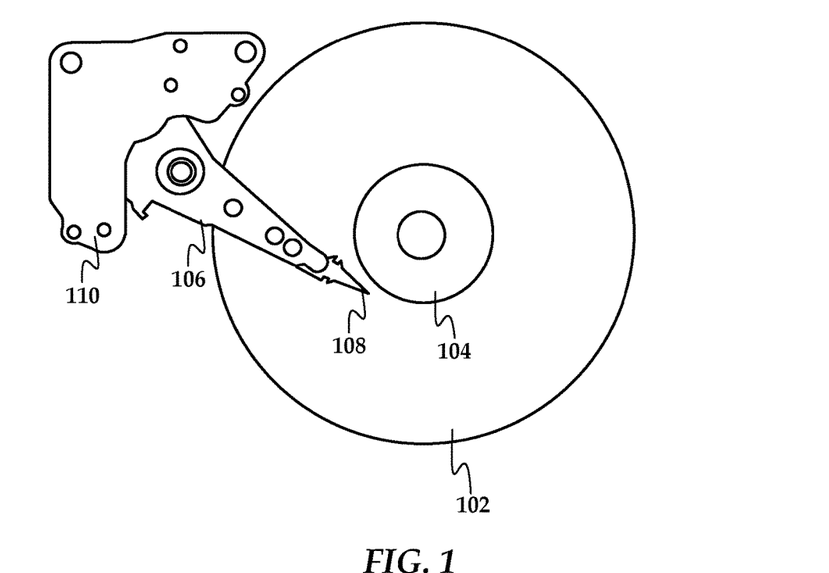
FIG. 1 is a top view of a data storage device according to an example embodiment.

In FIG. 1, a simplified plan view shows parts of a data storage device 100 according to an example embodiment. A magnetic disk 102 is driven by a spindle motor 104. An actuator arm 106 is held over the disk 102 and moved to different radial locations via an actuator, e.g., voice coil motor 110. A head-gimbal assembly (HGA) 108 is located at the end of the arm 106 and used to read data from and write data to the disk 102. The HGA 108 includes a head with integral read and write transducers, and is configured to at least write to multiple adjacent tracks simultaneously.

Figure 2:
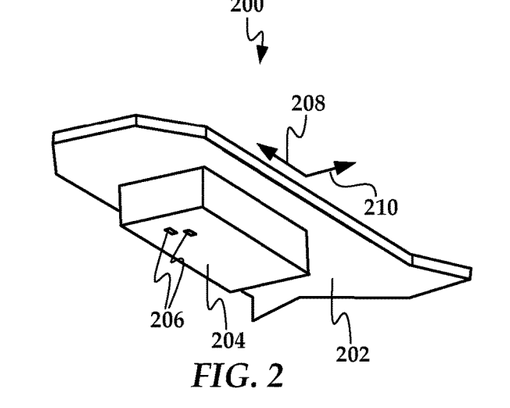
FIGS. 2 and 3 are perspective views of head-gimbal assemblies according to example embodiments.

In FIG. 2, a perspective view of an HGA 200 shows a multiple writer arrangement according to an example embodiment. A gimbal 202 provides physical support, e.g., a suspension, for a head 204. The gimbal 202 also includes signal lines, e.g., a flex circuit, that facilitates electrical coupling of the head 204 to a control board (not shown). The head includes two or more write transducers 206 that are offset from each other in a downtrack direction 208 and crosstrack direction 210.

Figure 3:
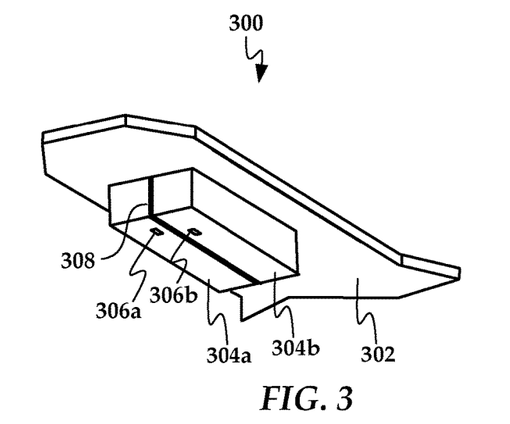

In FIG. 3, a perspective view of an HGA 300 shows a multiple writer arrangement according to an example embodiment. A gimbal 302 provides physical support for two separate head portions 304a, 304b. The gimbal 302 also includes signal lines, e.g., a flex circuit, that facilitates electrical coupling of the head portions 304a-b to a control board (not shown). The heads portions 304a-b may be formed separately (e.g., via layer deposition onto a wafer substrate) and assembled together with the gimbal 302, or assembled before attachment to the gimbal 302. Generally, there is a mechanical interface 308 between the heads 304a-b that may cause the heads 304a-b to be in a fixed orientation relative to one another. In other configurations, the mechanical interface 308 may be controllably deformable (e.g., using a heating element, piezoelectric element, etc.) to vary a downtrack and/or cross track orientation between the heads 304a-b. The heads 304a-b includes respective write transducers 306a-b that are offset from each other in a downtrack direction and crosstrack direction, using the same convention shown in FIG. 2.

Figure 4:
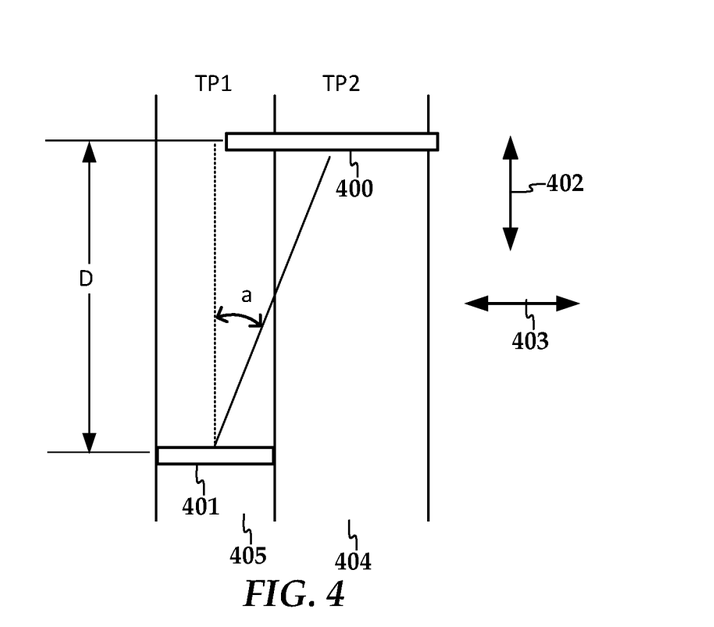
FIG. 4 is a block diagram showing parameters of a write head according to example embodiments.

In FIG. 4, a diagram shows parameters used in the discussion of TDMR multiple writer HGA embodiments discussed herein. In these examples, first and second writers 400, 401 are offset from each other in a downtrack direction 402 and a cross track direction 403. The recording medium moves in a downward direction in this view such that the first head 400 'ahead' of the second head 401 as the recording medium moves underneath. Thus, in some configurations, the second head 401 may overwrite some of the patterns written by the first head 400.

The parameter 'D' indicates a downtrack separation between first and second writers 400, 401. The parameter 'a' indicates a skew angle between the first and second writers 400, 401. The skew angle will change from an inner diameter (ID) of the disk to an outer diameter (OD) due to the rotation between the two locations of an arm that carries the head. The parameters TP1 and TP2 are track pitches of different tracks 405, 404. Generally, the TP1 parameter will be used as the track pitch in most examples below, as these examples show tracks being written at the same pitch. In cases where a track/zone is written using a different pitch, then TP2 will be used to indicate this difference.

In embodiments described below, at least one of the multiple writers may be able to write selectable, variable width, e.g., based on current skew angle of the heads. A conventional perpendicular magnetic recording (PMR) writer may be able to produce a track width that changes around 10% by varying input current to a write coil. Another recording technology, known as heat-assisted magnetic recording (HAMR), may be able to vary track with from a minimum width to a maximum width that is around 2-3× the minimum width without affecting the signal quality. This can be done by varying power input to a laser that heats the recording medium when recording. The combination of a highly variable hotspot size and wide magnetic writing field enables a HAMR device to write substantially variable track widths.

In current hard disks, it is expected that the value of D could be set to around 5 μm, and the range of skew angle is around 27°. Because write heads are active elements, echo from one to other makes it difficult to place them closer. However, these values of D and skew angle may not yield acceptable design because at high skew angles the adjacent tracks would be overlapping and/or too far separated. A first design path that deals with these geometry assumptions is to keep D=5 um, and reduce the skew angle range. For example, a linear actuator can maintain a constant skew angle of the head at different track locations. In such a case, either HAMR or PMR can be used for recording. Other types of actuators may also be used to reduce or eliminate skew angle, e.g., a rotating arm with an actuator that rotates the HGA relative to the arm and/or an actuator within the head that adjusts the relative orientation of the writers to account for skew angle.

In a second design path, the skew angle range can remain at around 27° and D is reduced. For example, three staggered HAMR writers (D~400 nm) and zone dependent TP1, TP2 can support ~28° skew angle range. In a third design path, the distance D and skew angle range can be optimized for a given application. In one example, three staggered HAMR writers (D~1 μm) and zone dependent TP1, TP2 are used to support a ~11.4° skew angle range. In such a case, two-track writing can be used within 11.4° skew angle range at the OD where performance matters, and single track writing can be used for the rest of the disk surface. In another example, stiffer actuators may be used to reduce skew angle range to 11.4° for the whole surface, targeting sequential performance.

Another example of this third design path involves using a dual actuator design with two heads accessing the same surface, hence dividing the required effective skew angle range by two. This latter arrangement could also be used with the first and second options described above to further optimize performance for a given application. In the following figures, multi-writer embodiments that can be used for these three design paths are discussed in more detail.

Figure 5:
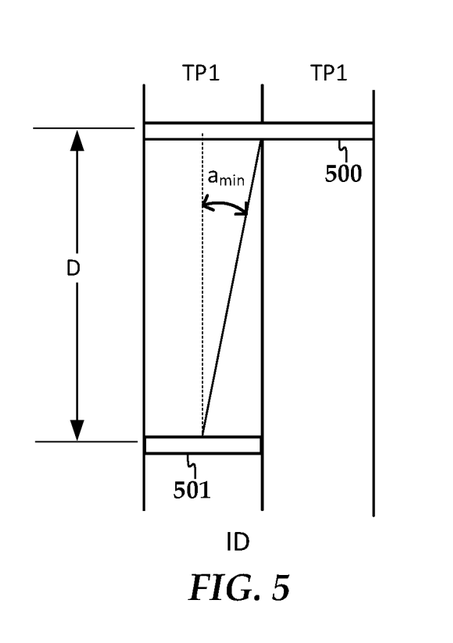
FIGS. 5 and 6 are block diagrams showing a first example embodiment having two writers.
Figure 6:
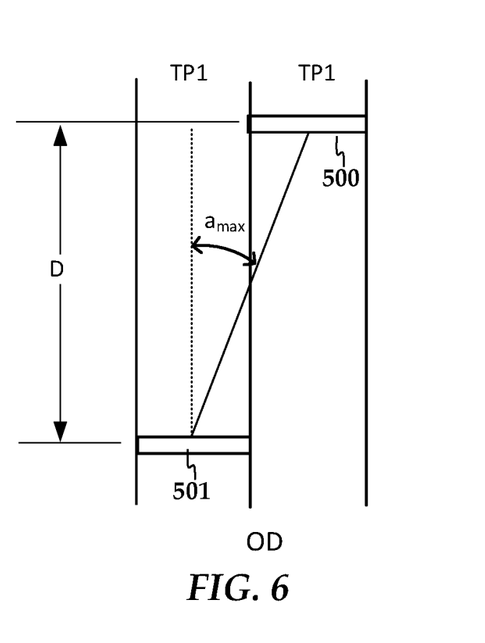

In FIGS. 5 and 6, block diagrams show a first example embodiment having two writers. An HGA includes two commonly-mounted writers 500, 501 that write adjacent tracks simultaneously at a single track pitch TP1. In FIG. 5, the writers 500, 501 are shown at a minimum skew angle at the ID, and in FIG. 6 the writers 500, 501 are shown at a maximum skew angle at the OD. At the ID, the first writer 500 writes at 2×TP1 to account for the small skew angle, and the second writer 501 overwrites about half of the first track at the TP1 pitch, similar to shingled magnetic recording (SMR). At the OD the writer 501 writes at the same width, TP1, as the other writer 500, and there is no partial overwriting of tracks. The skew angle range in this example is $a_{max}-a_{min}$, where $a_{max}=\tan^{-1}(TP1/D)$ and $a_{min}=\tan^{-1}(0.5*TP1/D)$.

Figure 7:
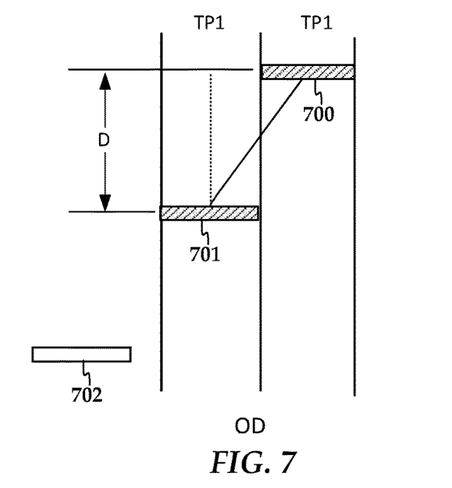
FIGS. 7-10, block diagrams showing a second example embodiment having three writers.
Figure 8:
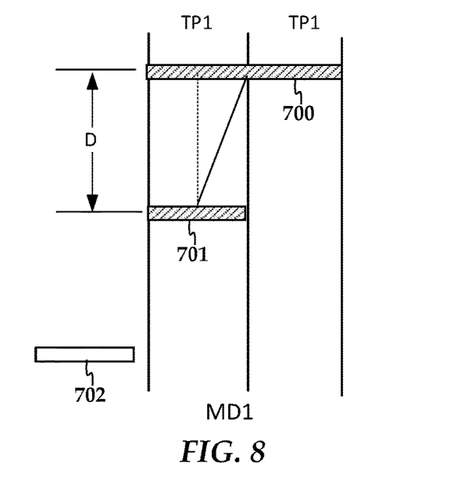
Figure 9:
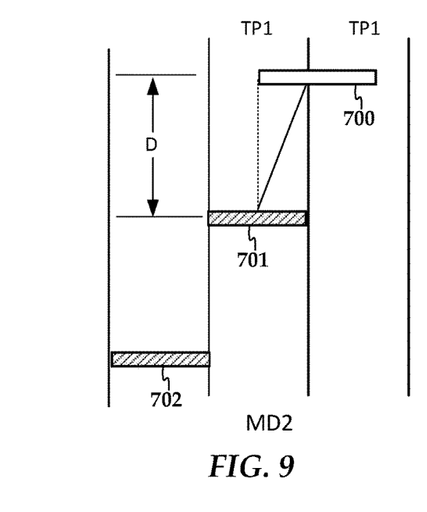
Figure 10:
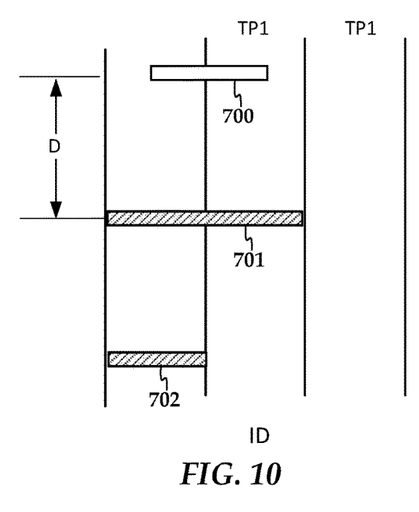

In FIGS. 7-10, block diagrams show a second example embodiment having three writers. An HGA includes three commonly-mounted writers 700-702, at least two of which write adjacent tracks simultaneously at a single track pitch TP1. The second writer 701 is located between the first and third writers 700, 702 in a crosstrack direction. As seen in FIG. 7, writers 700 and 701 are active at the OD, as indicated by the shading. In FIG. 8, the HGA has moved towards a first middle diameter region (MD1) that is away from the OD towards the ID. The first writer 700 uses a larger write width to compensate for the skew angle at MD1. In FIG. 9, the HGA is shown further towards the ID than in FIG. 7 at MD2 and in this view writers 701 and 702 are active. Writers 701 and 702 are also active in the view of FIG. 10, which is at the ID. In this case, the middle writer 701 is set to write at an increased width. The skew angle in FIG. 10 is zero, and so the skew range is the maximum skew shown in FIG. 7, which is $\tan^{-1}(TP1/D)$.

Figure 11:
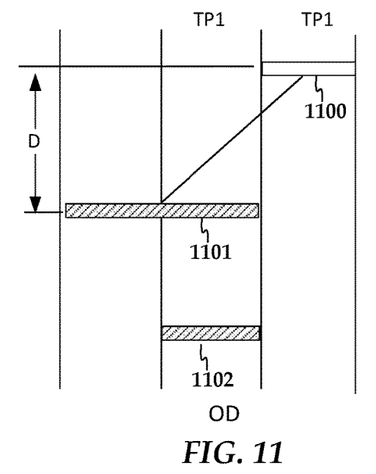
FIGS. 11-14 are block diagrams showing a third example embodiment having three writers.
Figure 12:
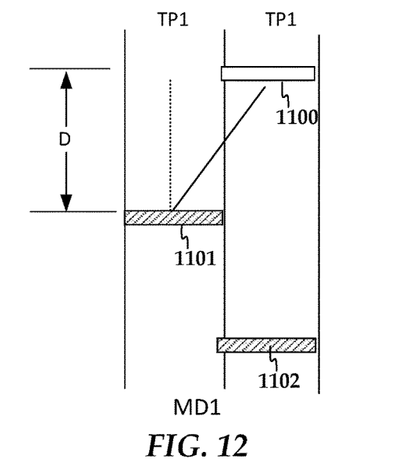
Figure 13:
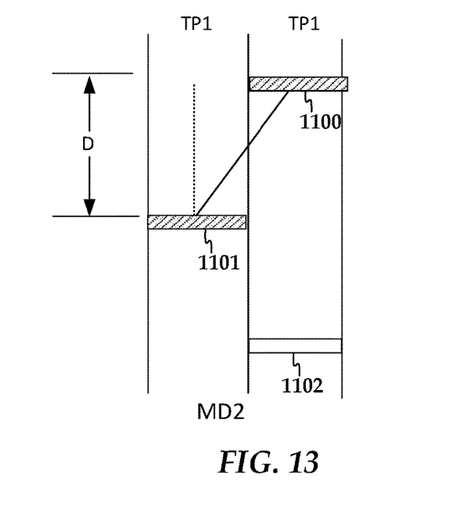
Figure 14:
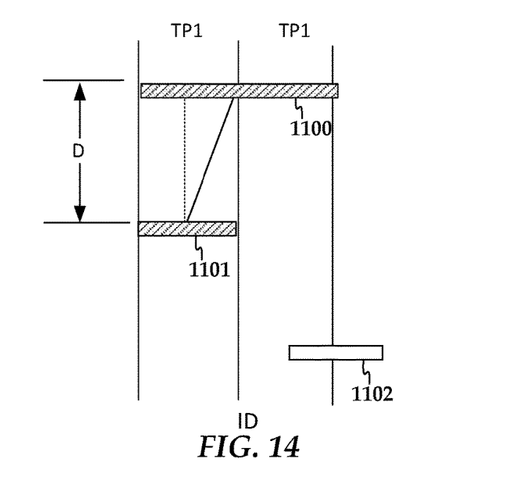

In FIGS. 11-14, block diagrams show a third example embodiment having three writers. An HGA includes three commonly-mounted writers 1100-1102, at least two of which write adjacent tracks simultaneously at a single track pitch TP1. The first and third writers 1100, 1102 are generally aligned in a crosstrack direction, and the second writer 1101 is offset from the first and third writers 1100, 1102 in the crosstrack direction. As seen in FIG. 11, writers 1101 and 1102 are active at the OD, as indicated by the shading. The second writer 1101 uses a larger write width to compensate for the angle. In FIG. 12, the HGA has moved to a middle diameter (MD1) that is away from the OD towards the ID. In FIG. 13, the HGA is shown at MD2 which is further towards the ID than MD1. In the views of FIGS. 13 and 14, writers 1100 and 1101 are active. In the view of FIG. 14, which is at the ID, the first writer 1100 is set to write at an increased width. The skew angle range in this example is $a_{max}-a_{min}$, where $a_{max}=\tan^{-1}(1.5*TP1/D)$ and $a_{min}=\tan^{-1}(0.5*TP1/D)$.

Figure 15:
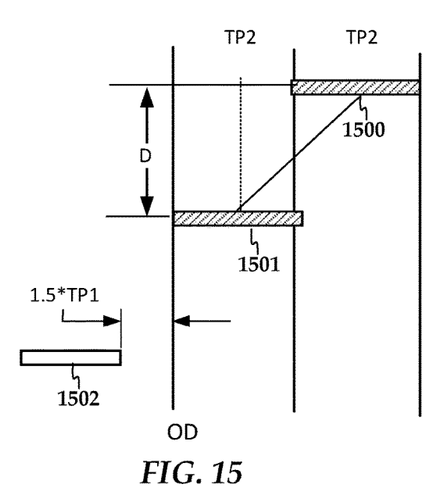
FIGS. 15-25 are block diagrams showing a fourth example embodiment having three writers.
Figure 16:
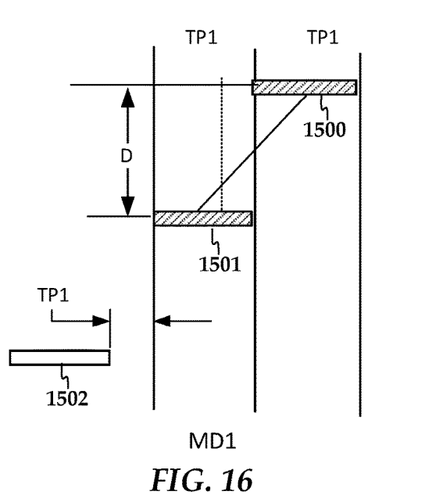
Figure 17:
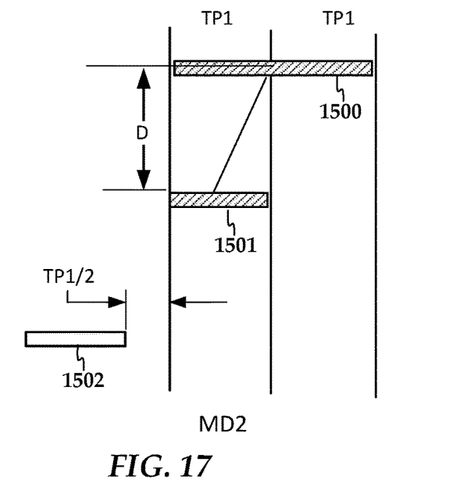
Figure 18:
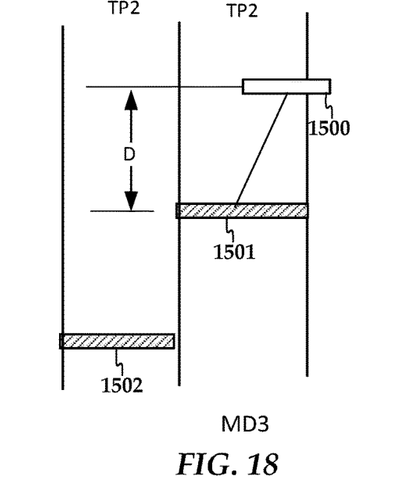
Figure 19:
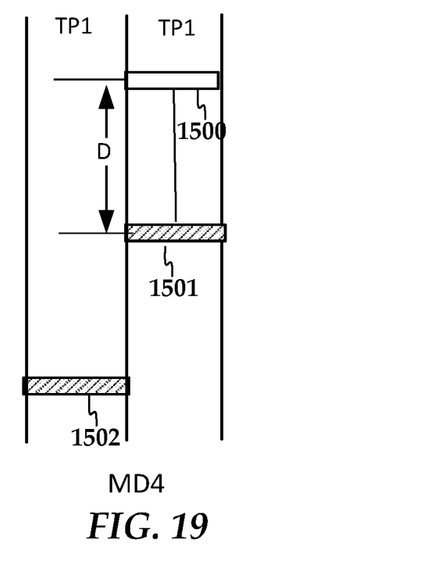
Figure 20:
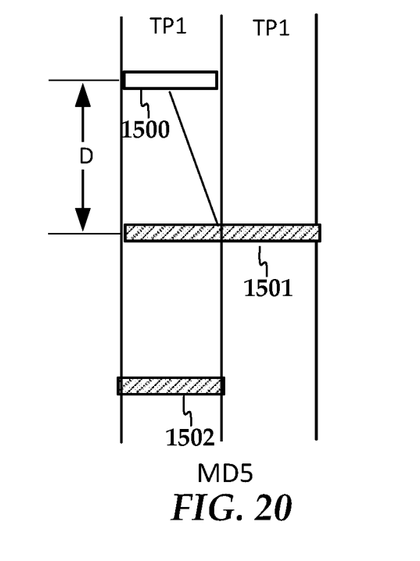
Figure 21:
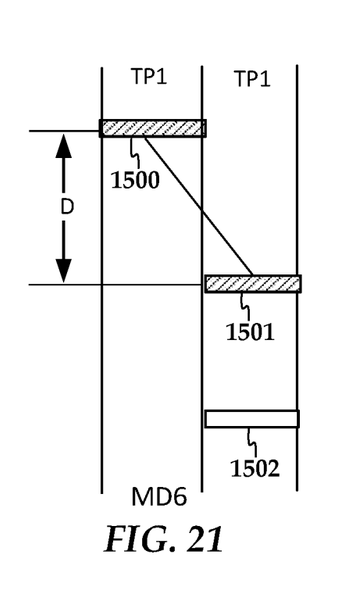
Figure 22:
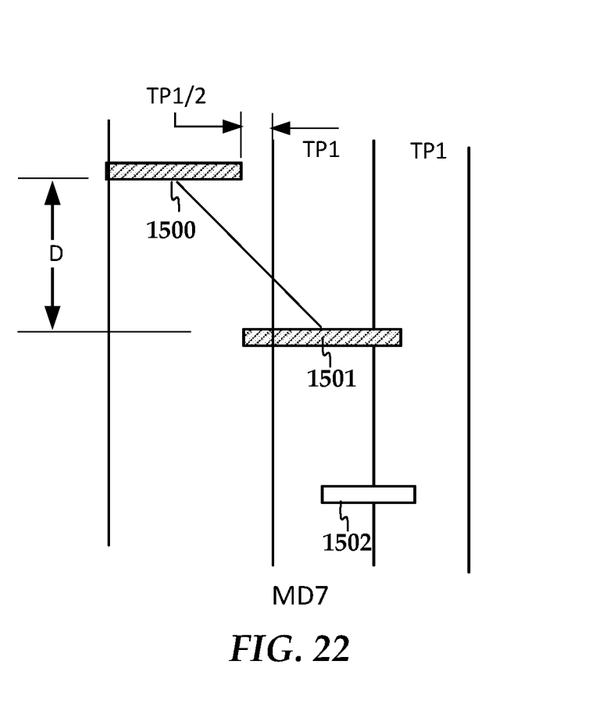
Figure 23:
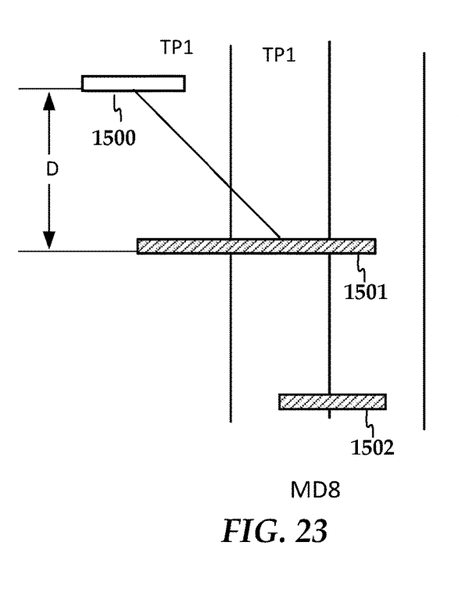
Figure 24:
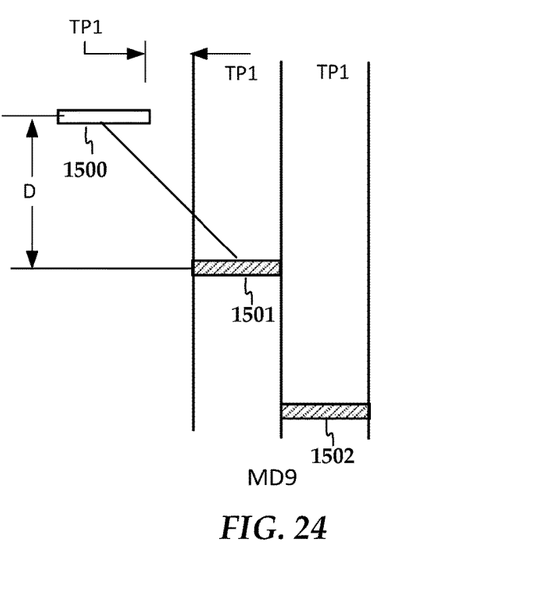
Figure 25:
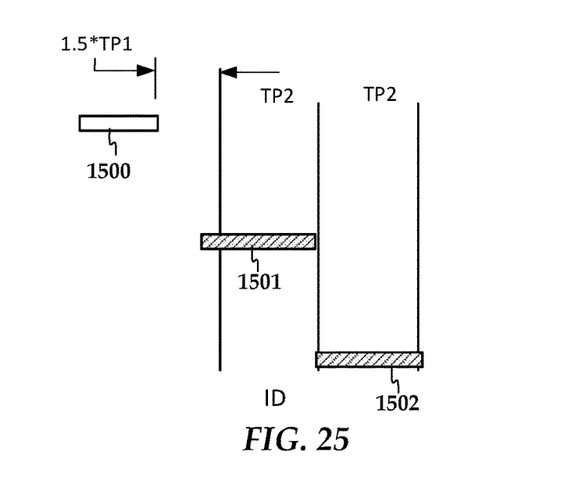

In FIGS. 15-25, block diagrams show a fourth example embodiment having three writers. An HGA includes three commonly-mounted writers 1500-1502, at least two of which write adjacent tracks simultaneously. The second writer 1501 is located between the first and third writers 1500, 1502 in a crosstrack direction. As seen in FIG. 15, writers 1500 and 1501 are active at the OD, as indicated by the shading. The writers 1500, 1501 write at a larger track pitch TP2 near the OD. Note that in FIG. 15 an inner edge of the third writer 1502 is 1.5*TP1 away from the facing inner edge of the second writer 1501. In the following FIGS. 16-24, the writers 1500-1502 are shown at MD1-MD9, which are middle diameter locations that are progressively closer to the ID. In all of these figures, both the track pitches are the same and equal to TP1 or equal to TP2. In FIG. 25, the writers are shown at the ID, and the track pitch is TP2. The skew angle range in this example is $a_{max}-a_{min}$, where $a_{max}=\tan^{-1}(-2.5*TP1/D)$ and $a_{min}=\tan^{-1}(1.5*TP1/D)$.

Figure 26:
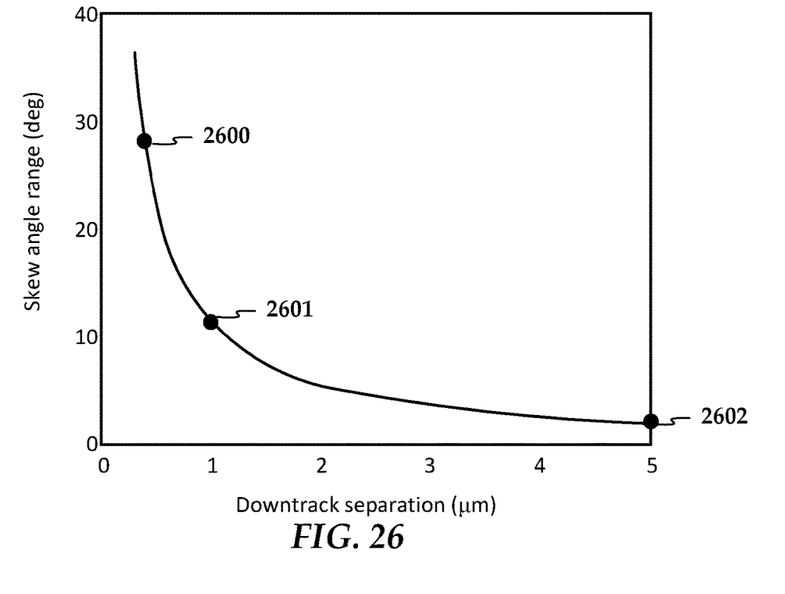
FIG. 26 is a graph of skew angle range versus downtrack separation for the fourth example embodiment.

In FIG. 26, a graph shows skew angle range versus downtrack separation for the configuration shown in FIGS.

15-25 where TP1 and TP2 are assumed to be 50 nm and 75 nm, respectively. Point 2600 on the curve shows that for about 28 degrees skew range, the downtrack separation between writers is 400 nm. Point 2601 indicates an approximate 11.4 degrees skew range for 1 µm of downtrack separation. Point 2602 indicates an approximate 2.3 degrees separation for 5 µm of downtrack separation.

Note that for any of the above designs, the target of 27 degrees skew angle range and 5 µm of downtrack separation between writers will not be obtained using the illustrated geometry. A first design path, as noted previously, utilizes a linear actuator that can move the head across the disk without skew (or at least negligible amounts of skew). For example, a linear motor, lead screw, moving coil, etc., may be used that moves the head in a linear path across the disk surface. Other options include an actuator that rotates the HGA to reduce or eliminates skew angle and/or an actuator in the head that causes relative displacement between the writers.

A second path is to use the three-writer design shown in FIGS. 15-25 and reduce the downtrack separation between writers to 400 nm. This may involve a different process to form the writers than is currently being contemplated. A third design path is to use a downtrack separation of 1000 nm, which may still require a change in fabrication process, although not as much of a change as the second design path. Using the three-writer design shown in FIGS. 15-25, this will provide a skew angle range of around 11.4 degrees. In order to use the full disk surface, a number of different configurations can be used.

A first configuration involves using multiple-writer recording in an 11.4 degree range at the OD, where it can have the greatest impact on performance. The rest of the disk surface will be recorded using a single writer. A second configuration is to design the mechanics to support a maximum 11 degree skew range. For example, an extended length actuator arm will reduce skew range. This may reduce random-access performance to some extent, but will improve sequential performance. A third configuration is to use a dual-actuator design that places two heads on each disk surface. Each of the two heads can have two or more magnetic writers configured as described above. In such a configuration, each head can be dedicated to a zone within each head's skew range. Each skew range is less than a full skew range of the disk. It will be understood that a device utilizing the concepts of the third design can use any combination of these configurations.

Figure 27:
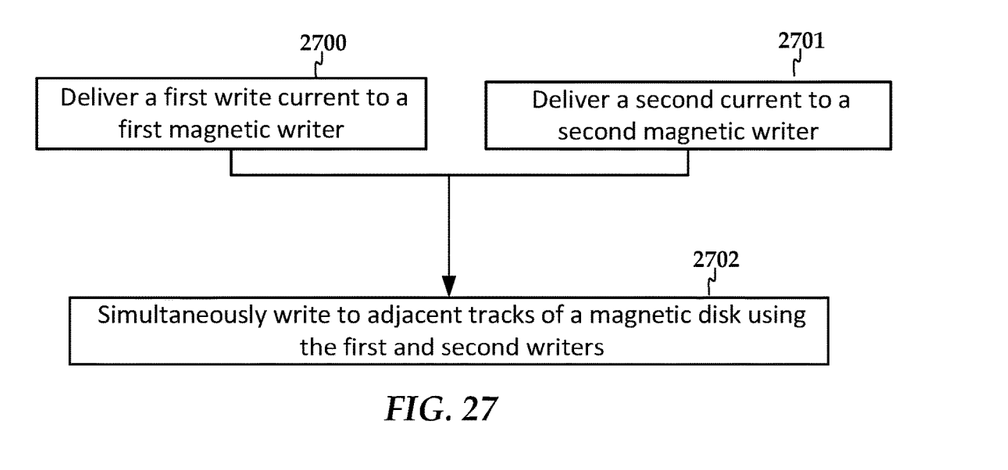
FIG. 27 is a flowchart of a method according to an example embodiment.

In FIG. 27, a flowchart shows a method according to an example embodiment. The method involves delivering 2700 a first write current to a first magnetic writer of a recording head. A second current is delivered 2701 to a second magnetic writer commonly located on the recording head. The second magnetic writer is offset from the first magnetic writer in a downtrack and crosstrack direction. The first and second write currents enabling the first and second writers to simultaneously write 2702 to adjacent tracks of a magnetic disk.

Figure 28:
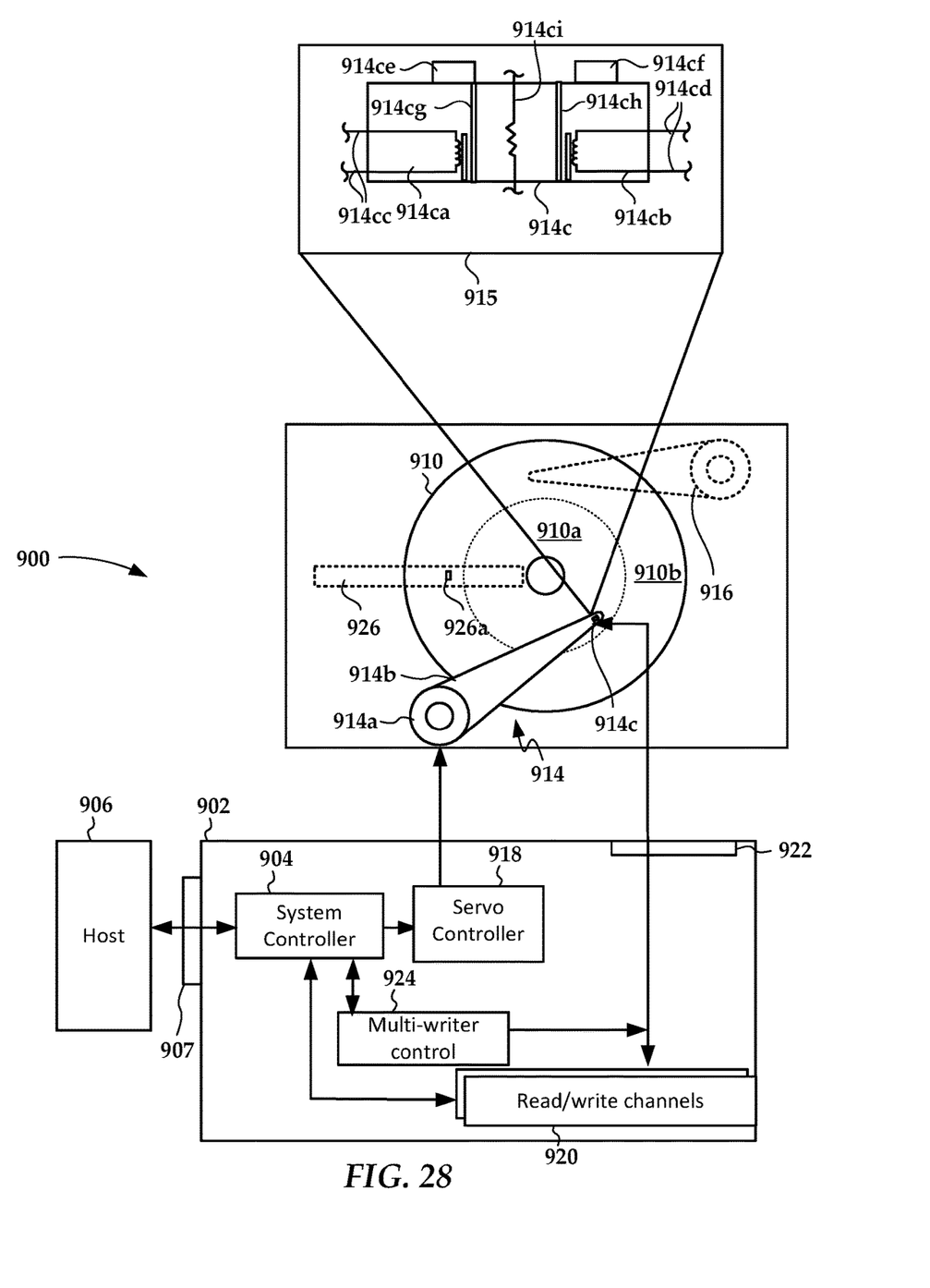
FIG. 28 is a block diagram of an apparatus according to an example embodiment.

In FIG. 28, a block diagram illustrates an apparatus 900 according to an example embodiment. The apparatus 900 includes circuitry 902 that facilitates writing data to and reading data from a magnetic disk 910. The circuitry 902 includes a system controller 904 that oversees operations of the apparatus 900. The system controller 904 may include a generally purpose central processing unit, application specific integrated circuit, multi-function chipset, etc. Generally, the system controller 904 receives commands from a host 906 via a host interface 907. The host commands may include requests to load, store, and verify data that is targeted for the disk 910.

The apparatus 900 is shown with an actuator assembly 914 that includes a voice coil motor (VCM) 914a, arm 914b, and write head 914c. A servo controller 918 provides control signals to the VCM 914a using servo data obtained from a read element as feedback. The read element may be integrated with the write head 914c or within a head gimbal assembly to which the write head 914c is mounted. As indicated in detail view 915, the write head 914c includes first and second magnetic writers 914ca, 914cb. Each of the writers 914ca, 914cb is shown with a respective write coil and pole that generate a magnetic field used for recording to the disk 910. The writers may also optionally include lasers 914ce, 914cf and optical paths 914cg, 914ch for HAMR embodiments.

The first and second magnetic writers 914ca, 914cb are offset from each other in a downtrack and crosstrack direction. Leads 914cc, 914cd are configured to deliver respective first and second write currents to the first and second writers 914ca, 914cb. The currents enable the first and second writers 914ca, 914cb to simultaneously write to adjacent tracks of the magnetic disk 910. Additional writers may be included in the write head 914c as described herein above.

Two or more read/write channels 920 may be used to provide currents to the writers 914ca, 914cb during recording. The read/write channels 920 are coupled to the writers 914ca, 914cb (as well as other components on the write head 914c) via interface circuitry 922 such as preamplifiers, digital-to-analog converters, analog-to-digital converters, filters, etc. A multi-writer control module 924 manages aspects of operating the writers 914ca, 914cb simultaneously, such as controlling write width of certain writers and predefined tracks (which correspond to know skew angle ranges), switching between multi-writer and single-writer modes, etc.

In order to deal with downtrack separation of the writers 914ca, 914cb and skew angle due to the movement of the arm 914b over the disk 910, the apparatus 900 may include optional features as described above. For example, a second actuator assembly 916 may include the same or similar components as actuator assembly 914 and write to the same surface of the disk 910 at the same time. The actuator assemblies 914, 916 may write exclusively to dedicated zones 910a-b at a common surface of the disk 910 to reduce a skew angle. The zones 910a-b may be configured with different track pitches and/or different linear bit densities, e.g., that are optimized for the respective heads of the actuator assemblies 914, 916.

The apparatus 900 may include a linear actuator 926 instead of or in addition to the VCM-type actuator 914. The linear actuator 926 moves a write head 926a in a straight line across the surface of the disk 910, as opposed to the arcuate path taken by arm 914b. The write head 926a is similarly configured to write head 914c. This results in zero skew (or nearly so) such that the write head 926a can utilize relatively large downtrack separation between multiple writers. The write head 914c may include a device such as a heater 914ci to affect relative location between the writers 914ca, 914cb. This can be used, e.g., to reduce skew angle, to perform active alignment of heads while writing, etc.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A recording head, comprising:
   a first magnetic writer;
   a second magnetic writer offset from the first magnetic writer in a downtrack and crosstrack direction; and
   leads configured to deliver respective first and second write currents to the first and second writers, the first and second write currents enabling the first and second writers to simultaneously write to adjacent tracks of a magnetic disk, wherein the first and second writers simultaneously write to the adjacent tracks at an outer diameter zone of the magnetic disk, only one of the first and second writers being used to write at other zones of the magnetic disk.

2. The recording head of claim 1, wherein the first magnetic writer is located ahead of the second magnetic writer when writing, a write width of the first magnetic writer being varied depending on a skew angle of the recording head over the magnetic disk.

3. The recording head of claim 2, further comprising a third magnetic writer located behind the second magnetic writer when writing, wherein a selected two of the first, second and third writers simultaneously write to adjacent tracks based on the skew angle.

4. The recording head of claim 3, wherein a second write width of the second magnetic writer is varied depending on the skew angle.

5. The recording head of claim 2, wherein at least one of the first and second writers comprises a heat-assisted magnetic recording writer.

6. The recording head of claim 1, further comprising:
   first and second head portions that each respectively include the first and second magnetic writers; and
   a controllably-deformable interface between the first and second head portions operable to vary at least one of a downtrack orientation and a crosstrack orientation between the first and second head portions.

7. A method, comprising:
   delivering a first write current to a first magnetic writer of a recording head;
   delivering a second current to a second magnetic writer commonly located on the recording head, the second magnetic writer offset from the first magnetic writer in a downtrack and crosstrack direction, the first and second write currents enabling the first and second writers to simultaneously write to adjacent tracks of a magnetic disk, the first magnetic writer being located ahead of the second magnetic writer when writing; and
   varying a write width of the first magnetic writer depending on a skew angle of the recording head over the magnetic disk.

8. The method of claim 7, wherein the recording head further comprises a third magnetic writer located behind the second magnetic writer when writing, the method further comprising selecting two of the first, second and third writers to simultaneously write to adjacent tracks based on the skew angle.

9. The method of claim 8, further comprising varying a second write width of the second magnetic writer depending on the skew angle.

10. The method of claim 7, wherein at least one of the first and second writers comprises a heat-assisted magnetic recording writer.

11. The method of claim 7, wherein the first and second writers simultaneously write to the adjacent tracks at an outer diameter zone of the magnetic disk, the method further comprising writing using only one of the first and second writers at other zones of the magnetic disk.

12. A system comprising:
    an actuator;
    a recording head mounted on the actuator, the recording head comprising a first magnetic writer and a second magnetic writer offset from the first magnetic writer in a downtrack and crosstrack direction, the first magnetic writer being located ahead of the second magnetic writer when writing; and
    control circuitry coupled to the recording head, the control circuitry configured to cause the first and second writers to simultaneously write to adjacent tracks of a magnetic disk, the control circuitry varying a write width of the first magnetic writer depending on a skew angle of the recording head over the magnetic disk.

13. The system of claim 12, wherein the recording head further comprises a third magnetic writer located behind the second magnetic writer when writing, wherein a selected two of the first, second and third writers simultaneously write to adjacent tracks based on the skew angle.

14. The system of claim 12, wherein the control circuitry dedicates the actuator and the recording head to a first region of the magnetic disk, a first skew range of the first region being less that a skew range of the magnetic disk, the system further comprising:
    a second actuator;
    a second recording head mounted on the second actuator, the second recording head comprising a third magnetic writer and a fourth magnetic writer offset from the third magnetic writer in the downtrack and the crosstrack direction, the control circuitry dedicating the second actuator and the second recording head to a second region of the magnetic disk different than the first region, a second skew range of the second region being less that the skew range of the magnetic disk.

15. A system comprising:
    an actuator;
    a recording head mounted on the actuator, the recording head comprising a first magnetic writer and a second magnetic writer offset from the first magnetic writer in a downtrack and crosstrack direction; and
    control circuitry coupled to the recording head, the control circuitry configured to cause the first and second writers to simultaneously write to adjacent tracks of a magnetic disk at an outer diameter zone of the magnetic disk, the control circuitry configured to write using only one of the first and second writers at other zones of the magnetic disk.

16. The system of claim 15, wherein the control circuitry varies a write width of the first magnetic writer depending on a skew angle of the recording head over the magnetic disk.

17. The system of claim 16, wherein the recording head further comprises a third magnetic writer located behind the second magnetic writer when writing, wherein a selected two of the first, second and third writers simultaneously write to adjacent tracks based on the skew angle.

18. The system of claim 15, wherein the actuator comprises a voice coil motor and an arm, the recording head is at an end of the arm.

19. The system of claim 15, wherein the recording head comprises:
   first and second head portions that each respectively include the first and second magnetic writers; and
   a controllably-deformable interface between the first and second head portions operable to vary at least one of a downtrack orientation and a crosstrack orientation between the first and second head portions.

\* \* \* \* \*